United States Patent
Poumarede et al.

(10) Patent No.: US 10,151,246 B2
(45) Date of Patent: Dec. 11, 2018

(54) ASSISTANCE DEVICE FOR A FREE-TURBINE ENGINE OF AN AIRCRAFT HAVING AT LEAST TWO FREE-TURBINE ENGINES

(71) Applicant: SAFRAN HELICOPTER ENGINES, Bordes (FR)

(72) Inventors: Vincent Poumarede, Tarbes (FR); Thomas Klonowski, Sedzere (FR); Fabien Mercier-Calvairac, Pau (FR); Camel Serghine, Boeil-Bezing (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 15/129,240

(22) PCT Filed: Mar. 26, 2015

(86) PCT No.: PCT/FR2015/050767
§ 371 (c)(1),
(2) Date: Sep. 26, 2016

(87) PCT Pub. No.: WO2015/145077
PCT Pub. Date: Oct. 1, 2015

(65) Prior Publication Data
US 2018/0187604 A1    Jul. 5, 2018

(30) Foreign Application Priority Data
Mar. 27, 2014 (FR) ....................... 14 00753

(51) Int. Cl.
*F02C 7/00* (2006.01)
*F02C 7/275* (2006.01)
(Continued)

(52) U.S. Cl.
CPC .............. *F02C 7/275* (2013.01); *B64C 27/12* (2013.01); *B64D 35/02* (2013.01); *B64D 35/08* (2013.01);
(Continued)

(58) Field of Classification Search
CPC .. F02C 7/275; F02C 3/10; F02C 3/107; F02C 7/32; F02C 7/762; B64D 35/08; B64D 35/02
(Continued)

(56) References Cited

U.S. PATENT DOCUMENTS 5,899,411 A     5/1999  Latos et al.
9,045,996 B2 *  6/2015  Anghel .................. F01D 15/10
(Continued)

FOREIGN PATENT DOCUMENTS

EP   2 581 586 A2   4/2013
EP   2 684 798 A1   1/2014
(Continued)

OTHER PUBLICATIONS

International Search Report dated Aug. 10, 2015 in PCT/FR2015/050767 filed Mar. 26, 2015.

*Primary Examiner* — Julio C. González Ramírez
(74) *Attorney, Agent, or Firm* — Oblon, McClelland, Maier & Neustadt, L.L.P.

(57) ABSTRACT

An assistance device for a free-turbine engine of an aircraft having at least two free-turbine engines, the device including an electrical starter machine for providing prolonged assistance to the gas generator of a first engine using energy produced by an electric generator machine driven by the second engine, the device further including at least one electricity storage member electrically connected to the electrical starter machine for providing a burst of assistance to the gas generator, wherein the electrical starter machine is (Continued)

Assisted super idle

Emergency starting powered by a first power converter enabling it to exchange energy with the storage member for providing the burst of assistance, and that transmits thereto the energy supplied by a second power converter for the prolonged assistance.

12 Claims, 4 Drawing Sheets

(51) Int. Cl.
    *B64D 35/08*     (2006.01)
    *F02C 3/10*     (2006.01)
    *F02C 3/107*     (2006.01)
    *F02C 7/262*     (2006.01)
    *F02C 7/36*     (2006.01)
    *F02C 9/42*     (2006.01)
    *B64C 27/12*     (2006.01)
    *B64D 35/02*     (2006.01)
    *F02C 7/32*     (2006.01)
    *H02K 7/18*     (2006.01)
    *H02K 7/20*     (2006.01)

(52) U.S. Cl.
    CPC ............... *F02C 3/10* (2013.01); *F02C 3/107* (2013.01); *F02C 7/262* (2013.01); *F02C 7/32* (2013.01); *F02C 7/36* (2013.01); *F02C 9/42* (2013.01); *H02K 7/1823* (2013.01); *H02K 7/20* (2013.01); *F05D 2220/329* (2013.01); *F05D 2220/76* (2013.01); *Y02T 50/671* (2013.01)

(58) Field of Classification Search
    USPC ............... 290/52, 30 R, 31, 38 C, 38 R, 32; 244/53 R, 53 A; 307/11, 22; 60/596, 60/325
    See application file for complete search history.

(56) References Cited

U.S. PATENT DOCUMENTS

| | | | |
|---|---|---|---|
| 2009/0224599 A1* | 9/2009 | Yue | H02J 1/10 307/9.1 |
| 2010/0038961 A1* | 2/2010 | Divito | F02D 25/00 307/9.1 |
| 2013/0086919 A1 | 4/2013 | Dooley et al. | |
| 2013/0219905 A1 | 8/2013 | Marconi et al. | |
| 2014/0013751 A1 | 1/2014 | Roggemans et al. | |
| 2014/0333127 A1* | 11/2014 | Edwards | H02J 4/00 307/9.1 |
| 2015/0130186 A1 | 5/2015 | Vieillard | |

FOREIGN PATENT DOCUMENTS

| | | |
|---|---|---|
| FR | 2 967 133 A1 | 5/2012 |
| WO | 2013/167837 A2 | 11/2013 |

* cited by examiner

Assisted super idle

Normal starting

Emergency starting

_US 10,151,246 B2_

ASSISTANCE DEVICE FOR A FREE-TURBINE ENGINE OF AN AIRCRAFT HAVING AT LEAST TWO FREE-TURBINE ENGINES

TECHNICAL CONTEXT

The invention lies in the field of assemblies comprising a plurality of free-turbine engines, as are commonly to be found on helicopters.

It should be recalled that a free-turbine engine includes a power turbine or "free turbine" that, in a helicopter, drives the rotors of the helicopter via an overrunning clutch or "freewheel" and a main gearbox (MGB), and also includes a gas generator constituted mainly by a compressor, a combustion chamber, and a high pressure (HP) turbine.

The shaft of the gas generator is connected by stepdown gearing or an accessory gearbox to an electrical machine constituted by a stator and a rotor, and capable of operating equally well as a motor (starter) or as a generator. In motor mode, the electrical machine is powered by a source of electricity and it develops driving torque so as to drive the gas generator of the engine in rotation, particularly for the purpose of starting it, thus providing assistance in starting. In generator mode, the electrical machine is driven in rotation by the gas generator in order to take mechanical power off therefrom, which mechanical power is converted into electrical power.

While an aircraft having two free-turbine engines is in cruising flight, proposals have been made in Documents FR 2 967 132 and FR 2 967 133 to put one of the two engines in a standby mode so as to desynchronize its free turbine from the MGB while increasing the power drawn from the other engine, thereby enabling the overall fuel consumption of the system to be reduced. Several variants of that standby mode have been proposed.

In a first variant, referred to as "super idle" the gas generator of the desynchronized gas turbine can be regulated on a slow idling speed.

In a second variant, referred to as "assisted super idle", the gas generator of the gas turbine that is desynchronized from the MGB can also be regulated on a slow idling speed, while assistance driving torque is simultaneously being applied to the gas generator via the electrical machine and the accessory gearbox.

In a third variant, the combustion chamber of the engine may be completely extinguished, and it is then proposed to maintain the gas generator in rotation at a speed that facilitates re-ignition at the end of the stage of cruising flight. The appropriate range of speeds may be called a "preferred ignition window". This mode of operation, referred to as "turning" mode, involves providing the gas generator with assistance that is prolonged.

In these three modes of operation, which may be maintained throughout the duration of cruising flight, the power transmitted to the MGB by the engine on standby is generally zero, and it is generally not possible to draw power from its gas generator.

In the three variants mentioned above, it is necessary to be able to reactivate the desynchronized engine quickly, in particular in an emergency, e.g. in the event of another engine failing, if there are three or more engines in all, or indeed of the other engine failing if there are two engines. That is why the gas generator is kept rotating at a speed that facilitates re-ignition in the system where the combustion chamber is extinguished.

Maintaining the gas generator in rotation in the preferred ignition window ("turning" mode) and providing prolonged assistance to the gas generator while it is regulated on an idling speed ("assisted super idle" mode) both require relatively little power, but end up requiring considerable energy, since the purpose of the system lies in using it throughout a flight of long duration. Among other solutions, FR 2 967 132 and FR 2 967 133 propose using an electric starter powered by a starter/generator connected to the gas generator of the other engine, or a generator that is driven directly or indirectly by the free turbine of the other engine.

As for emergency restarting from a low speed situation or with the combustion chamber extinguished, it is necessary to apply high power to the shaft of the gas generator because of the considerable inertia of the rotary assemblies and because of the opposing torque from the compressor of the engine. That power needs to be delivered during a short duration, of the order of a few seconds, in order to enable the engine to restart quickly. In FR 2 967 133 it is suggested, among other possibilities, that electrical energy can be used, in particular taken from a supercapacitor, to provide the gas generator with a burst of assistance.

In Document EP 2 602 458, proposals are made to use power taken from the power turbine of the first engine in order to assist rotating the gas generator of the second engine. Power is transferred by using two electrical machines. It enables fuel consumption to be reduced. The second engine is maintained in idle mode.

In Document EP 2 581 586, proposals are also made to use two supercapacitors (which are members for storing electrical energy), each of which is charged by a respective electricity generator driven by the gas generator of one of the two engines, and each of which serves to provide a burst of energy for starting the other engine from that engine being in an extinguished state.

In Document FR 2 914 697, a burst of acceleration assistance is given to the gas generator of an engine, in particular by delivering mechanical power to the gas generator via an electrical machine that is driven in rotation by the free turbine. The system also operates to provide assistance in deceleration.

In this context, the present invention seeks to propose a structure making it possible both to deliver power continuously to the gas generator of a first turbine engine from the other turbine engine particularly but not necessarily in the context of providing prolonged assistance in rotating the gas generator of said first engine in its preferred ignition window, and also to propose the use of an electrical storage member that is charged by one engine and that serves to provide a burst of energy to the gas generator of the second engine when restarting or assisting the acceleration of said second engine. The structure may preferably, but not necessarily, be independent of the on-board electricity network (in particular it may be independent in terms of electrical power supply, and it may also be electrically isolated therefrom) and it may be easy to implement in practice in an aircraft.

DESCRIPTION OF THE INVENTION AND THE ASSOCIATED ADVANTAGES

For this purpose, there is provided an assistance device for a free-turbine engine of an aircraft having at least two free-turbine engines, the device comprising an electrical starter machine and an electric generator machine, the electrical starter machine providing prolonged assistance to the gas generator of a first engine using energy produced by the electric generator machine driven by the second engine, the assistance device further comprising at least one electricity storage member electrically connected to said electrical starter machine for providing a burst of assistance to said gas generator, the assistance device further comprising a first power converter and a second power converter, the electrical starter machine being powered by the first power converter that enables it to exchange energy with the storage member for providing the burst of assistance, and that transmits thereto the energy supplied by the second power converter for the prolonged assistance, the assistance device being characterized in that it further comprises a computer for cutting off the flow of fuel to the gas generator during a determined period during the prolonged assistance and for maintaining said gas generator at a reduced speed for facilitating re-ignition of said gas generator.

In certain implementations, the above-mentioned electrical machines may function equally well in motor mode and in generator mode, in which case the architecture may be symmetrical, each of the two engines being capable of being assisted in turn. Nevertheless, an asymmetrical architecture is also possible, with assistance being provided for only one of the two engines.

Because of this structure, it is possible with limited weight and with a limited number of components to install the various functions for burst assistance in flight, for burst assistance on starting, and for prolonged assistance for rotating the gas generator, such as for example maintaining it in rotation in prolonged manner in the absence of combustion in the combustion chamber. It is also possible to start the engine in conventional manner, or to provide it with dry motoring. It should be recalled that dry motoring consists in driving the gas generator in rotation at a low speed for about ten seconds, while the fuel supply is cut off, so as to use the stream of air generated by the compressor to cool certain internal subassemblies of the engine, and so as to clear from the combustion chamber any accumulation of un-burnt fuel resulting from a failure to ignite during starting.

The system with two power converters makes it possible to manage exchanges of energy between the electrical machine driven by the gas generator of the first engine, which generally supplies alternating current (AC), the electrical machine for providing assistance to the gas generator of the second engine, which is generally also an AC machine, and the storage member, which may in particular deliver direct current (DC). Thus, these two converters enable to energy sources to be used that are not of the same nature (DC or AC) or that do not have the same characteristics (low or high voltage, different frequencies).

The device may include a bus, e.g. a high-voltage DC bus between the electricity storage member and the first converter, the bus being independent (electrically isolated) from the electricity network of the aircraft. Thus, the requirements of regulations concerning the on-board network do not apply to this bus, and its voltage may be different from the voltage of the on-board network, and adapted for storing energy in the storage member and also for optimizing the weight of the electrical machines and the power converters.

Advantageously, the first converter is servo-controlled. Thus, the first converter serves to control the speed (frequency) and the torque applied to the starter rotary machine (AC machine).

Advantageously, a disconnector member (static, electromechanical, or other) enables the two converters to be electrically isolated from each other, the storage member remaining connected to the first power converter. Thus, the storage member may transmit energy solely to the gas generator of the first engine, without applying any to the second power converter.

Advantageously, the first electrical machine is also a generator. This makes it possible to recharge the electricity storage device with energy coming from the first electrical machine via the first power converter.

Advantageously, a switch member enables the second power converter to be connected to the electrical storage member. This makes it possible to recharge the electricity storage device with energy coming from the second engine, via the second power converter.

Advantageously, with the help of the electricity storage member, the device may be controlled, via the first power converter, to provide a burst of assistance in optionally accelerating or decelerating said gas generator of the first engine in controlled manner during twin-engined flight. As set out in document FR 2 914 697, this method makes it possible to improve the transient performance of the engine, and thus to reduce the amplitude of the drop or the increase in the speed of the rotors of the aircraft resulting from a rapid variation in the power demanded from said engine. It is specified that in the event of a deceleration of the gas generator, the burst of assistance involves taking energy away, whereas in the event of the power generator being accelerated, the burst of assistance involves delivering energy without taking any energy from the on-board network of the aircraft.

Advantageously, the second power converter is powered by an electrical machine operating as a generator and driven by the gas generator of a second engine of the aircraft. As a result of this technical option, an assistance device is obtained that can be independent of the on-board network, thereby significantly reducing problems of electromagnetic disturbances, in particular those conveyed by electric cables, simplifying installation, and avoiding any need to overdimension the on-board network, the electricity generation system, or the battery of the aircraft. Furthermore, the assistance device may be provided by the engine manufacturer in the context of a design and certification process that is distinct from the design and certification process for the aircraft.

For example, the generator second electrical machine also has a function of starting the second engine. Thus, weight is saved and the number of devices needed is decreased, and it is possible to implement conventional starting of the first engine, or indeed dry motoring of the engine, using the assistance device.

Advantageously, the device includes one storage element per engine in order to participate in burst accelerations of the gas generators of either of the engines.

In addition to each of the two engines thus being provided with a burst assistance function that is specific thereto, the fact of having one storage element per engine makes it possible to segregate electrically the assistance devices of the two engines when they are contributing simultaneously to the propulsion of the aircraft (twin-engined flight condition).

In certain embodiments, the prolonged assistance may be performed during periods in which said gas generator is in operation, the mechanical energy being adapted to maintain said gas generator at a low speed that minimizes fuel consumption. Under such circumstances, the computer maintains the flow of fuel to the gas generator for a determined period during prolonged assistance and it reduces the speed of the gas generator so as to minimize fuel consumption.

Finally, the electricity storage member may comprise at least a supercapacitor, a hybrid competitor, a lithium-ion battery, or a flywheel optionally having an integrated DC/AC power converter.

It is advantageously proposed that the electricity storage member should be recharged by taking energy from the gas generator of the first or second engine during periods in which said gas generator is supplied with fuel.

It is advantageously specified that the storage member is more particularly designed to accept, without damage, discharge sequences that are characterized by high power and short duration, of the order of a few seconds, and that in this respect it is dedicated solely to the function of providing a burst of assistance to the gas generator of the engine. In this context, it is used in particular for normal starting functions, emergency starting, and dry motoring, and also for assistance in flight.

The invention also provides an aircraft having at least two free-turbine engines, and including an assistance device as mentioned.

The aircraft may be a helicopter.

The invention is described below with reference to the accompanying figures.

LIST OF FIGURES

Figure 2:
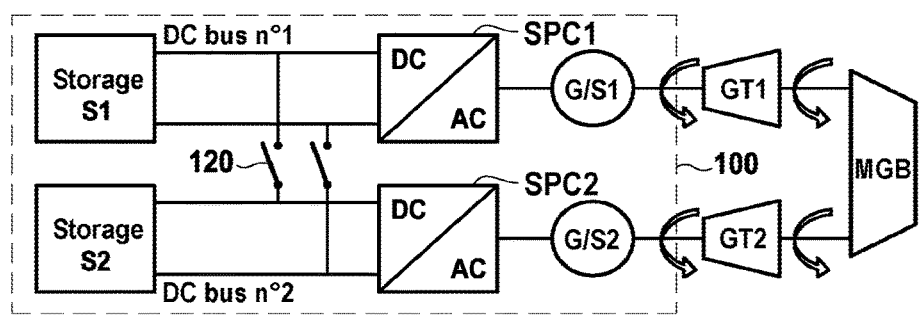
FIG. 2 is a more particular diagram of an embodiment of the invention.

FIGS. 3 to 9 each show a stage or a mode of use of the embodiment of FIG. 2.

Figure 10:
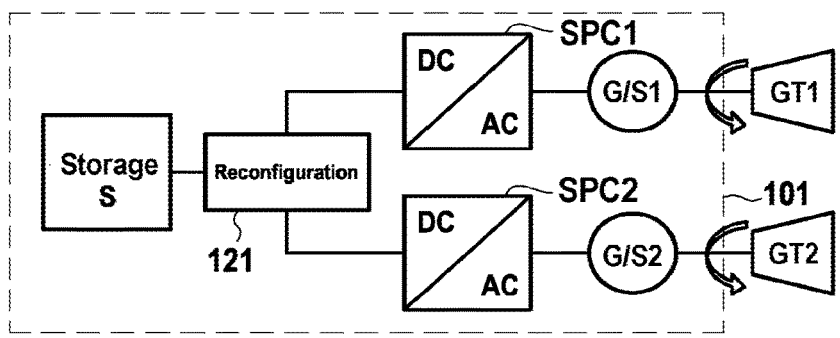

FIG. 10 shows an alternative embodiment of the invention.

Figure 11:
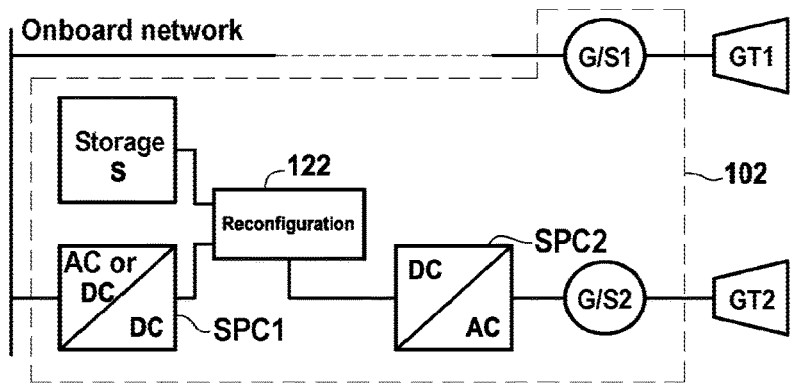

FIG. 11 shows another alternative embodiment of the invention.

Figure 12:
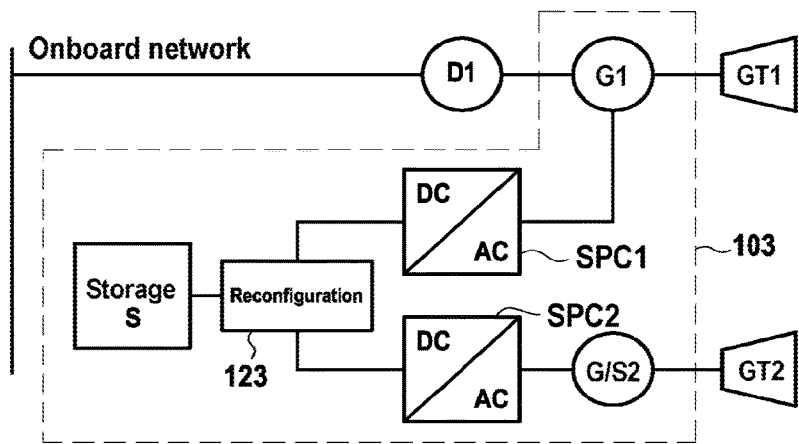
Figure 13:
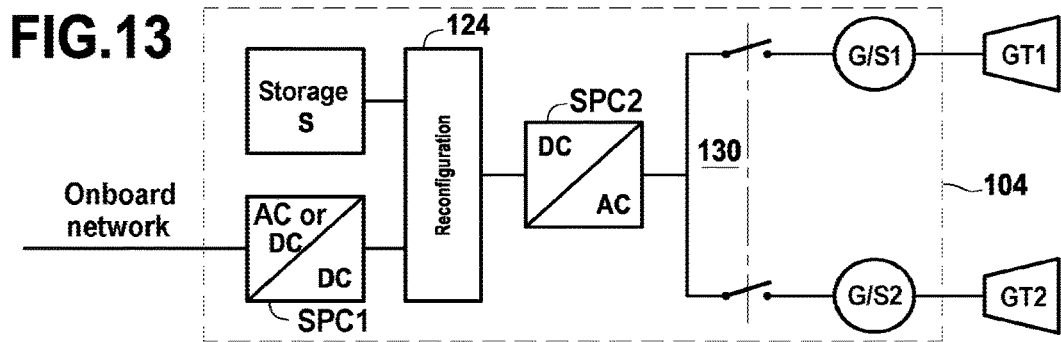

FIGS. 12 and 13 show two other alternative embodiments of the invention.

DETAILED DESCRIPTION

Figure 1:
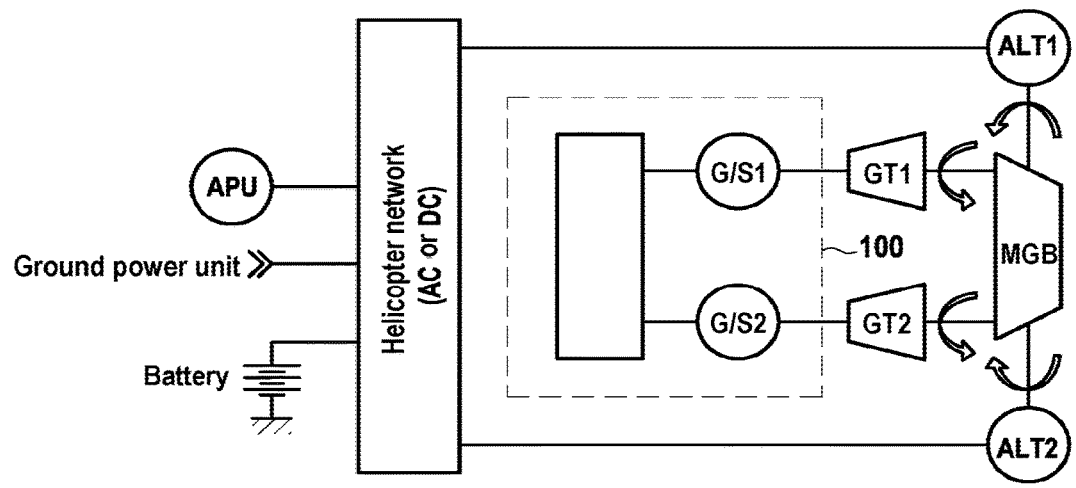
FIG. 1 is an overall diagram of a system of the invention, incorporated in the propulsion and electrical systems of the aircraft.

With reference to FIG. 1, the general electrical architecture of an embodiment of the proposed system is as follows.

The generation of electricity on the aircraft is provided by at least two alternators ALT1 and ALT2 driven by the main gearbox MGB, typically three-stage type 115 VAC/400 Hz machines, although other rotary machines could be envisaged.

This architecture is advantageous in the context of single-engined low-cost cruising flight since it guarantees functional and organic independence between electricity generation and the operation of the turbine engines, thus making it possible to conserve a sufficient level of availability and redundancy for generating electricity during low-cost cruising flight, while one of the two engines is being maintained in a standby mode that is incompatible with taking any power from its gas generator.

Furthermore, this architecture is less penalizing for the operation of the engines than taking power from the gas generators of the engines, in particular in terms of impact on acceleration and specific consumption performance, insofar as the mechanical power corresponding to the electrical power consumed by the on-board network of the aircraft is taken from the free turbine and not from the gas generator.

ALT1 and ALT2 power the electricity network of the aircraft, other available energy sources for powering this network possibly being constituted by an on-board auxiliary power unit APU, one or more storage batteries, or indeed, when on the ground, a ground power unit.

The main gearbox MGB is driven by the engines GT1 and GT2. In this example they are free-turbine turboshaft engines. Each of them has a gas generator and a power turbine (free turbine) driving the MGB via a freewheel.

Each engine GT1 and GT2 has a respective rotary machine (respectively G/S1 and G/S2) suitable for operating as a starter and as a generator, and in the embodiment described mechanically connected to the gas generator of the engine via an accessory gearbox. In order to optimize the compactness and the weight of the device, it is preferred for G/S1 and G/S2 to present a machine architecture that is compatible with being driven at high speed by the gas generator, and thus without a rotor winding, such as for example and in non-exhaustive manner a brushless synchronous machine with permanent magnets, a variable reluctance machine, or an asynchronous machine. The two machines G/S1 and G/S2 are included in an independent electrical assembly 100 that operates independently of the electricity network of the aircraft.

With reference to FIG. 2, the independent electrical assembly 100 comprises the following subassemblies.

Firstly there are two buses, Bus No. 1 and Bus No. 2 operating with direct current (DC) and at high voltage (of the order of several hundreds of volts), which buses are independent of each other and of the on-board network.

The independent electrical assembly further comprises two reversible DC/AC static power converters SPC1 and SPC2 (e.g. of the two level inverter type or of some other type) that serve in particular to power and control the rotary machines G/S1 and G/S2 in torque and in speed. While the electrical machine is being driven by the gas generator, each of these converters is capable of operating as a controlled rectifier and of regulating the voltage of the corresponding bus.

The independent electrical assembly 100 further comprises electricity storage members S1 and S2 that are optimized for delivering short and intense discharges of power. By way of example, they may be supercapacitors, or hybrid capacitors (possibly fitted with their own control system), lithium ion (Li-ion) batteries fitted with their own battery management systems (BMSs) or a flywheel (with its loading/unloading AC/DC converter).

The independent electricity assembly 100 also includes an electrical disconnector member 120 of the electromechanical contactor type or of the solid sate power controller (SSPC) type serving to connect together the two DC buses (in parallel), and conversely to isolate electrically on one side the assembly S1, Bus 1, SPC1, G/S1, GT1 and on the other side the assembly S2, Bus 2, SPC2, G/S2, GT2.

Figure 3:
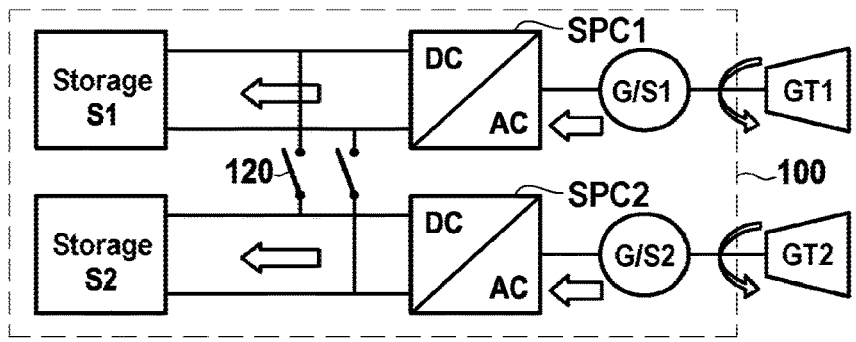

With reference to FIG. 3, there follows a description of a stage of twin-engined flight.

Once both engines GT1 and GT2 have started, the two electrical machines G/S1 and G/S2 are driven by the gas generators of the engines GT1 and GT2 and they operate in generator mode, with the DC/AC converters being controlled as rectifiers in application of an appropriate current/voltage relationship for the purpose of recharging and/or maintaining the charge in the storage members S1 and S2. The disconnector member 120 is open circuit.

Since the storage members might possibly have been discharged while starting the engines on the ground, it may be necessary to wait for the storage members S1 and S2 to be charged once more to their nominal level prior to authorizing takeoff.

Recharging or maintaining charge of the storage members S1 and S2 (in order to compensate for internal losses e.g. due to balancing cells in a pack of supercapacitors or a battery, or indeed due to friction in a flywheel) is performed in a manner that is independent from the on-board network by taking energy from the gas generators of the respective engines GT1 and GT2. Depending on their technology, compensation for losses in each storage member S1 and S2 may represent no more than a few tens of watts under steady conditions.

In this mode of operation, the DC buses are electrically isolated from each other and they operate independently of each other.

Furthermore, in a variant, sequential management of the recharging of the storage members is implemented using a hysteresis type relationship: the member is charged up to an energy threshold E1, and then recharging is inhibited (i.e. no more power is taken from the gas generator) until the energy stored drops—as a result of internal losses—to below a threshold E2 that is less than E1. With battery or hybrid capacitor type technologies involving active balancing circuits, quite long pauses are achieved between two recharging stages.

Figure 4:
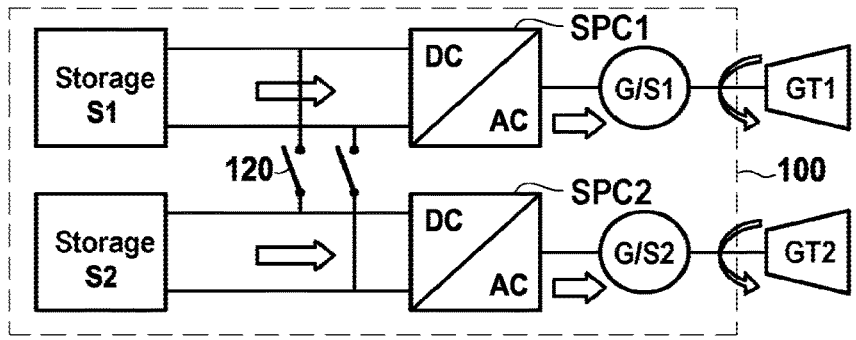

With reference to FIG. 4, in twin-engined flight, the energy stored in the members S1 and S2 is used to optimize the operation of the engines. The general idea is to provide a transient input of mechanical energy to the gas generator of one of the engines. Two modes of operation can then be envisaged, and they are described in detail below. They are described for operation while the disconnector member 120 is open circuit.

Firstly, it is possible to deliver a burst of assistance for accelerating the gas generator. In the event of pitch being increased quickly from a low speed, delivering mechanical power to the gas generator serves to improve its acceleration, and therefore increase the speed with which the engine delivers power to the free turbine, and consequently significantly decrease the transient drop in the speed of rotation of the rotor of the helicopter as occurs at the end of such a maneuver, thus increasing the safety margin of the crew.

This function provides a significant improvement to performance when the initial speed of the gas generator is slow. This mode of operation may be activated automatically at the request of the turbine computer when various criteria are satisfied, e.g. and in non-limiting manner: the system is available (no failure detected), the level of energy stored in the members S1 and S2 is sufficient, the engine is operating, the initial speed of the gas generator lies in a given range, and a rapid increase in power demand is detected as a result of the operating line of the engine approaching its limit for protection against surging.

The surge of assistance is deactivated when the operating line of the engine moves away from its limit for protection against surging, when the level of energy stored drops below a certain threshold, or when the speed exceeds a certain threshold.

Thereafter, it is possible to deliver a burst of assistance for decelerating the gas generator. In the event of a rapid reduction in pitch during which deceleration of the gas generator is limited by the anti-flameout relationship, it is proposed to increase the generation setpoint of the converters for a few instants so as to take off a large amount of power from the gas generators. As a result, it is possible to decelerate the gas generator more quickly, and thus increase the speed with which regulation of the engine decreases the flow rate of fuel injected into the combustion chamber and consequently decrease the amplitude of the transient increase in the speed of the rotor.

This mode of operation is activated automatically at the request of the turbine computer when various criteria are satisfied, for example and in non-limiting manner: the operating line comes close to the anti-flameout flow rate limit, and providing there is the capacity available for storing the energy that is taken from the gas generator while it is being decelerated.

In a variant, the capacity of the storage member is thus slightly overdimensioned in order to ensure under all circumstances that there is a margin for storing energy.

In alternative manner, a device may be added to the DC bus for dissipating the energy taken to decelerate the gas generator, such as for example an assembly made up of a resistance element and a braking chopper arm.

It is also possible to provide a burst of assistance of the power injection type. Mechanical power $P_{mec}$ is injected to the gas generator so as to obtain an increased effect on the free turbine. In certain zones of the flight envelope, it is possible to recover power $K \cdot P_{mec}$ from the free turbine, and thus from the MGB of the helicopter with gain K greater than 1. It should be observed that when appropriate conditions are present, delivering assistance to the gas generator can thus be more efficient than delivering assistance that is equivalent except that it is injected directly to the free turbine or to the MGB. This mode of operation may be activated when the energy stored in the members S1 and S2 is sufficient, either in preventative manner on request of the crew, e.g. taking off with high load and/or at high altitude and/or at high temperature, or else automatically at the request of the engine computer in order to provide additional power for a short duration at the one engine inoperative (OEI) contingency rating, e.g. in the event of the speed of the free turbine dropping below a certain threshold or on detecting a loss of power from the other engine.

Figure 5:
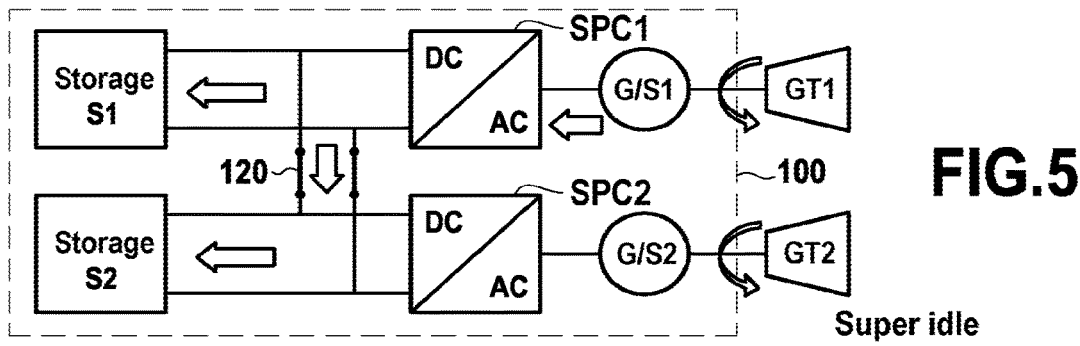

With reference to FIG. 5, there can be seen a single-engined low-cost cruising stage of flight.

When the conditions for allowing this mode are present, which implies amongst other things that there is sufficient energy stored in the members S1 and/or S2, the avionics sends a go-to-standby instruction to the computer of the gas turbine (e.g. GT2 in the figure).

In a first variant as shown in FIG. 5, referred to as the "super idle" variant, the computer of GT2 reduces the flow rate of fuel and regulates the speed of the gas generator to a low setpoint value, enabling the power turbine to be desynchronized from the MGB (so the power delivered to the helicopter is then zero) and enabling fuel consumption to be low. Simultaneously, the electrical machine G/S2 and the associated converter SPC2 are inhibited so as to avoid taking power from the gas generator of GT2.

The electrical machine G/S1 and its converter SPC1 pass to "generator" mode (if they were not already there); the two DC buses are then electrically connected together by reconfiguring the disconnector member 120. Energy taken from the gas generator of GT1 is used for maintaining charge in the storage members S1 and S2: this charge-maintaining function may be performed continuously or else discontinuously and sequentially on each of the two members.

Figure 6:
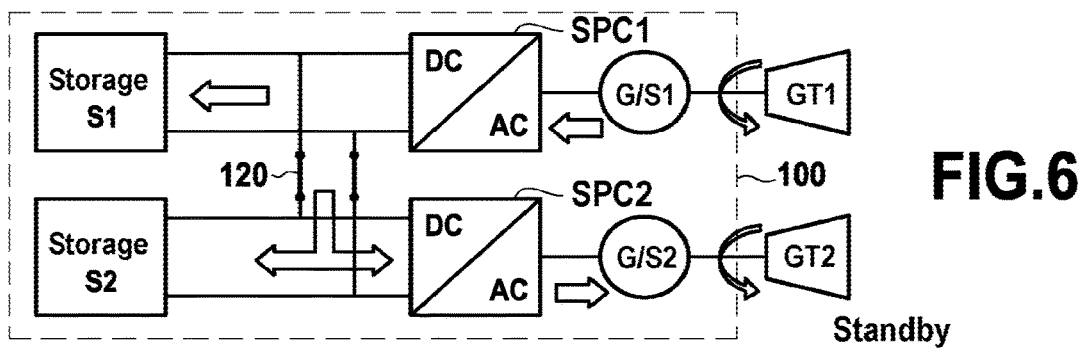

In a second variant, as shown in FIG. 6, the computer of the engine GT2 cuts off the flow of fuel and regulates the speed of the gas generator on a setpoint value. Since the combustion chamber of GT2 is extinguished, fuel consumption is zero and the free turbine becomes desynchronized with the MGB. Simultaneously, the electrical machine G/S2 and the associated converter SPC2 pass into motor mode with the speed setpoint as defined by the regulator and corresponding to the ideal ignition window for the combustion chamber. The gas generator passes into autorotation, and after a few seconds, its speed stabilizes on this setpoint, the combustion chamber being extinguished. The electrical machine G/S1 and its converter SPC1 pass into generator mode, if they were not already there.

The two DC buses are electrically connected together by reconfiguring the disconnector member 120. Energy taken from the gas generator of the engine GT1 is used to maintain charge in the storage members S1 and S2 and to power the electrical machine G/S2 via the power converter SPC2. This aspect constitutes prolonged assistance to the gas generator of the engine GT2, and is referred to as "turning" mode.

Figure 7:
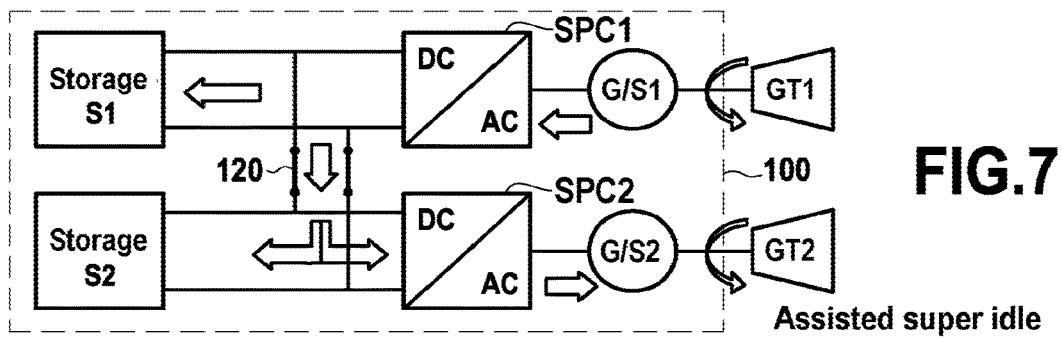
Figure 8:
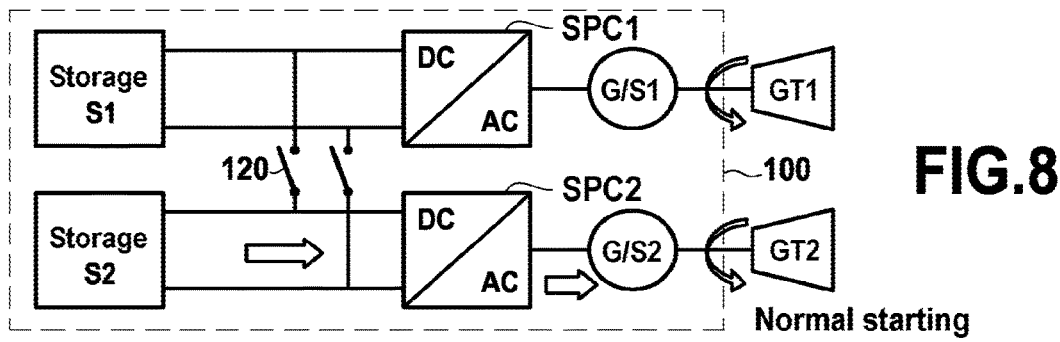

In a variant shown in FIG. 7, the computer maintains the supply of fuel to the engine GT2, and it is provided with prolonged assistance in rotating its gas generator, on the same principle as that described with reference to FIG. 6. For this purpose, the computer regulates the speed of the gas generator to a setpoint value so as to optimize the operation of the turbine and so as to minimize fuel consumption. In such a mode of operation, referred to as "assisted super idle", SPC2 and G/S2 operate in motor mode.

During these stages of operation, the electrical assembly 100 remains independent from the on-board network.

Single-engined low-cost cruising flight mode can be exited in two different ways. Firstly, with reference to FIG. 8, when restarting GT2 is not urgent, it is started at the request of the avionics using the normal procedure: initially, the two DC buses are electrically isolated from each other by reconfiguring the electrical disconnector member 120.

If the engine GT2 was initially on standby with its combustion chamber ignited ("super idle" or "assisted super idle" mode), the electrical machine G/S2 is controlled so as to deliver driving torque to provide a burst of assistance using energy stored in the storage member S2 to accelerate the gas generator. Simultaneously, the computer of the engine GT2 increases the fuel flow rate in application of a predefined relationship. If the engine GT2 was initially on standby with the combustion chamber extinguished ("turning" mode), the computer initiates a starting sequence analogous to that described above except that the gas generator of the engine GT2 is already being driven in the ideal ignition window. When ignition of the combustion chamber is detected, the torque delivered by the electrical machine G/S2 is increased and the computer of the engine GT2 increases the flow rate of fuel in application of a predefined relationship. Either way, when the speed NG exceeds a sustainable threshold, the electrical assistance is disconnected and the engine GT2 accelerates by its own means up to flight speed.

It should be observed that an analogous sequence can be used for starting the engine while the helicopter is on the ground, before takeoff, except that the gas generator of each engine is initially fully stopped. The engines are usually started sequentially, one after the other. Once both engines have started, and before takeoff, the storage members S1 and S2 are recharged using the procedure describe above (see FIG. 3).

Figure 9:
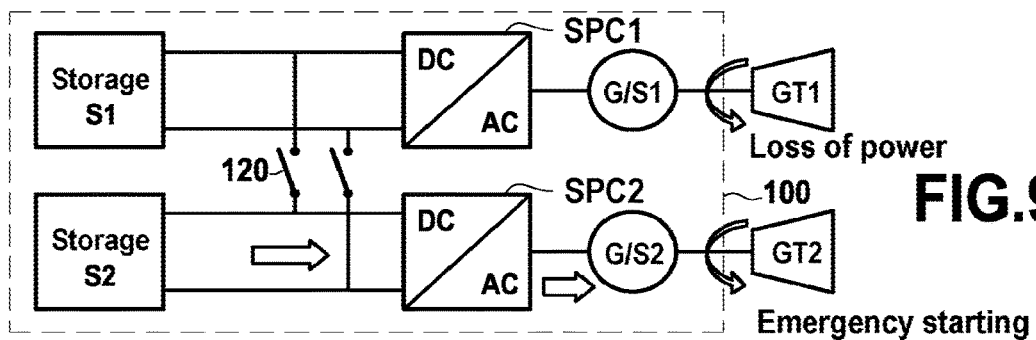

With reference to FIG. 9, under certain conditions of single-engined low-cost flight, the crew might require power from the engine GT2 quickly: this can happen for example in the event of power being lost from the engine GT1, or in the event of an unexpected power need requiring power from both engines and thus justifying a quick exit from the single-engined mode (avoiding an obstacle, etc.). Under such circumstances, restarting is performed using the emergency procedure, the purpose being to cause the engine GT2 to reach its flight speed or even its OEI rating in a short period of time.

Initially, the two DC buses are electrically isolated by reconfiguring the electrical disconnect member 120. If the engine GT2 was initially on standby with its combustion chamber ignited ("super idle" or "assisted super idle" mode), then the electrical machine G/S2 is operated so as to deliver driving torque in order to provide a burst of assistance in accelerating the gas generator, this assistance being at a level that is substantially higher than for the normal restarting procedure. Simultaneously, the computer of the engine GT2 increases the fuel flow rate in application of a predefined relationship, likewise optimized for fast restarting of the turbine.

If the engine GT2 was initially on standby with the combustion chamber extinguished ("turning" mode), the computer triggers ignition of the combustion chamber, with this operation being made easier by the fact that the gas generator is already being driven in rotation in the ideal ignition window. Thereafter, as above, the computer proceeds to request a burst of electrical assistance for accelerating the gas generator and it increases the flow rate of fuel in application of a predefined relationship, likewise optimized for fast restarting of the turbine.

In both situations, the burst of electrical assistance to the gas generator may be extended beyond the starter cut-off speed threshold used in the normal starting procedure in order to minimize the time taken by the engine to accelerate to its flight or OEI rating.

Once the helicopter is on the ground, before switching off the turbines, it may be advisable to recharge the storage members of the electrical hybridizing device so that they are ready for subsequent starting. This procedure may be performed during the required passage to the "ground idle" speed used for balancing temperatures in the engines before stopping them.

A variant is described with reference to FIG. 10.

The independent electrical assembly 101 is similar to the independent electrical assembly 100 as described above, but the storage members S1 and S2 are replaced by a single storage member S. By way of example, it is dimensioned so as to be capable of emergency starting a single engine. The advantage is then a saving of almost two in terms of weight and compactness. In recharging mode (twin-engined operation), one of the two power converters SPC1 or SPC2 is specified as the "master" by the supervisor computer and is in charge of recharging the storage member S. The reconfiguration member 121 enables the storage member S to be connected to the converter SPC2 and enables the assembly S-SPC2-G/S2 to be electrically isolated from the assembly SPC1-G/S1, or on the contrary, it enables the storage member S to be connected to the converter SPC1 and the assembly S-SPC1-G/S1 to be electrically isolated from the assembly SPC2-G/S2 for the stages of charging the member S with one or the other of the engines or of providing a burst of assistance to an engine.

The reconfiguration member 121 is also capable of keeping the assembly SPC2(G/S2)-SPC1(G/S1) electrically connected together for single-engined stages of flight involving powering one of the electrical machines operating as a motor by the other electrical machine operating as a generator ("turning" mode and "assisted super idle" mode).

Another variant is described with reference to FIG. 11.

In this example, the electrical assembly 102 is not independent from the on-board network. Electrical connection between electrical machine G/S1 and the converter SPC1 takes place via the on-board network. There is only one electrical storage member S and it is dedicated to providing a burst of assistance to the engine GT2 via the converter SPC2 and the electrical machine G/S2. It may be charged by the converter and the electrical machine G/S1 or by the converter SPC2 and the electrical machine G/S2, in particular as a function of the position of the reconfiguration member 122. The engine GT1 is not put into a standby mode during low-cost cruising flight. In contrast, the engine GT2 may be put into a standby mode with its combustion chamber ignited ("assisted super idle" mode) or with its combustion chamber extinguished ("turning" mode), with the electrical energy needed for prolonged assistance to the gas generator then coming from the engine GT1 via G/S1, SPC1, SPC2, and G/S2, or via ALT1, SPC1, SPC2, and G/S2 (see ALT1 in association with FIG. 1). In this second example, G/S1 may be replaced by a simple, non-controlled starter.

The reconfiguration member 122 enables the storage member S to be connected to the converter SPC2 and enables the assembly S-SPC2-G/S2 to be electrically isolated from the assembly SPC1 and on-board network, or on the contrary enables the storage member S to be connected to the converter SPC1 and the assembly S-SPC1-G/S1 to be electrically isolated from the assembly SPC2-G/S2 for the stages of charging the member S or of providing a burst of assistance to an engine.

Another variant is described with reference to FIG. 12. The engine GT1 has an accessory board including motion takeoffs for two electrical machines, specifically a starter electrical machine D1 and a generator electrical machine G1. The machine D1, which is used for normal starting of the engine GT1, is powered by the on-board network, while the machine G1 is connected to the converter SPC1. The remainder of the electrical circuit is similar to that of FIG. 9. The single storage member S is dedicated to providing a burst of assistance to the engine GT2.

The reconfiguration member 123 enables the storage member S to be connected to the converter SPC2 and enables the assembly S-SPC2-G/S2 to be electrically isolated from the assembly SPC1-G1, or on the contrary it enables the storage member S to be connected to the converter SPC1 and the assembly S-SPC1-G/S1 to be electrically isolated from the assembly SPC2-G/S2-GT2 for the stages of charging the member S by one or other of the engines or of providing a burst of assistance to the engine GT2.

The reconfiguration member 123 is also capable of keeping the assembly SPC2(G/S2)-SPC1(G1) connected together for the stages of flight that involve powering the electrical machine G/S2 by the electrical machine G1.

The assembly constituted by the elements G1, SPC1, 123, S, SPC2, and G/D2 is an independent electrical assembly referenced 103. It is independent from the on-board network.

Another variant is described with reference to FIG. 13.

The electrical assembly 104 comprises a converter SPC1 connected to the on-board network.

It also comprises a converter SPC2 connected to switch members 130 for connecting it either to the electrical machine G/S1 connected to the engine GT1, or to the electrical machine G/S2 connected to the engine GT2. The two electrical machines G/S1 and G/S2 must not both be connected at the same time to the converter SPC2.

A configuration member 124 also serves to connect the sole storage member S to the converter SPC1 in order to be charged by the on-board network, or to the converter SPC2 to provide a burst of assistance to one of the engines GT1 and GT2, as a function of the position of the switch member 130. The storage member S can also be connected to both converters SPC1 and SPC2 simultaneously.

The reconfiguration member 104 enables the converter SPC1 to be connected via the switch member 130 to the converter SPC2 in order to provide prolonged assistance to the gas generator of the engine connected to the converter SPC2 (in particular in standby mode with the combustion chamber extinguished while the gas generator is maintained in the preferred ignition window, i.e. in "super idle" mode, and in standby mode with the chamber ignited, i.e. in "assisted super idle" mode).

It should be recalled that the on-board network is powered by one or more alternators that are driven indirectly or directly by at least one of the engines GT1 or GT2, and that when one or the other of them is extinguished, it is necessarily the other one that provides power in prolonged manner to the on-board network.

The invention is not limited to the embodiments described, but extends to all variants within the ambit of the scope of the claims.

The invention claimed is:

1. An assistance device for a free-turbine engine of an aircraft having first and second free-turbine engines, the assistance device comprising:
 a first electrical machine and second electrical machine, the first electrical machine providing prolonged assistance to a gas generator of the second free-turbine engine using energy produced by the first electrical machine driven by the first free-turbine engine;
 an electricity storage member electrically connected to the second electrical machine for providing a burst of assistance to said gas generator of the second free-turbine engine;
 a first power converter and a second power converter, the first electrical machine being connected to the first power converter and the second electrical machine being connected to the second power converter, the first power converter converting energy supplied by the first electrical machine for the prolonged assistance, and the second power converter exchanging energy with the electricity storage member for providing the burst of assistance; and
 a computer programmed to
  during a determined period during the prolonged assistance, cut off a flow of fuel to the gas generator of the second free-turbine engine to maintain said gas generator of the second free-turbine engine at a reduced speed for facilitating re-ignition of said gas generator of the second free-turbine engine, and
  when the burst of assistance is provided to the gas generator of the second free-turbine engine, increase the flow of fuel to the gas generator of the second free-turbine engine.

2. The assistance device according to claim 1, wherein a disconnector member enables the first and second power converters to be electrically isolated from each other, the electricity storage member remaining connected to the first power converter.

3. The assistance device according to claim 1, wherein the first electrical machine is also a generator.

4. The assistance device according to claim 1, wherein the second electrical machine is driven by the gas generator of the second free-turbine engine.

5. The assistance device according to claim 1, wherein a switch member enables the second power converter to be connected to the electricity storage member.

6. The assistance device according to claim 1, wherein the second power converter is powered by a generator electrical machine driven by the gas generator of the second free-turbine engine of the aircraft.

7. The assistance device according to claim 1, wherein the electricity storage member can be used, where appropriate, for assisting in controlled acceleration or deceleration of said gas generator of the second free-turbine engine under twin-engined flight conditions.

8. The assistance device according to claim 1, including one electricity storage element per engine in order to participate in burst accelerations of the gas generators of either of the first and second free-turbine engines.

9. The assistance device according to claim 1, wherein the computer maintains the flow of fuel to the gas generator of the second free-turbine engine for a determined period during prolonged assistance and the computer reduces the speed of the gas generator of the second free-turbine engine so as to minimize fuel consumption.

10. The assistance device according to claim 1, wherein the electricity storage member comprises a supercapacitor, a hybrid competitor, a lithium-ion battery, or a flywheel having an integrated DC/AC converter.

11. The assistance device according to claim 1, wherein the electricity storage member is recharged by taking energy from the gas generator of the first or second free-turbine engine during periods in which said gas generator of the second free-turbine engine is supplied with fuel.

12. The aircraft having at least two free-turbine engines, and including an assistance device according to claim 1.

* * * * *